US007411354B2

(12) United States Patent
Hsu et al.

(10) Patent No.: US 7,411,354 B2
(45) Date of Patent: Aug. 12, 2008

(54) FEEDBACK AND PROTECTION CIRCUIT OF LIQUID CRYSTAL DISPLAY PANEL BACKLIGHT APPARATUS

(75) Inventors: Da-Jing Hsu, Taipei County (TW); Hui-Qiang Yang, Taipei County (TW)

(73) Assignee: Niko Semiconductor Co., Ltd., Taipei (TW)

( * ) Notice: Subject to any disclaimer, the term of this patent is extended or adjusted under 35 U.S.C. 154(b) by 104 days.

(21) Appl. No.: 11/641,310

(22) Filed: Dec. 20, 2006

(65) Prior Publication Data

US 2008/0151450 A1 Jun. 26, 2008

(51) Int. Cl.
*G09G 3/10* (2006.01)
*H05B 41/24* (2006.01)

(52) U.S. Cl. .................................... 315/169.3; 315/276

(58) Field of Classification Search ............. 315/169.3, 315/169.4, 209 R, 210–211, 213, 219, 220, 315/224, 274–275, 277, 279, 291, 307
See application file for complete search history.

(56) References Cited

U.S. PATENT DOCUMENTS 6,011,360 A * 1/2000 Gradzki et al. .............. 315/244
6,509,696 B2 * 1/2003 Bruning et al. ............. 315/246
6,982,886 B2 * 1/2006 Fukumoto .................... 363/72
2006/0006811 A1 * 1/2006 Green et al. ............ 315/209 R

* cited by examiner

*Primary Examiner*—Douglas W. Owens
*Assistant Examiner*—Minh Dieu A
(74) *Attorney, Agent, or Firm*—WPAT, P.C.; Anthony King

(57) ABSTRACT

A feedback and protection circuit is provided for detecting voltage and current of a cold cathode fluorescent lamp (CCFL) of a liquid crystal display (LCD) panel backlight apparatus and integrating all voltage and current input signals to output single current and voltage feedback signals to a PWM controller, so as to stabilize and control the voltage and current of the CCFL and determine whether any detected input signal is abnormal. If any CCFL is short circuited (CCFL is touched by people) or open circuited (CCFL is not lit), an abnormal status protection signal will be produced and sent to the PWM controller to stop all outputs of the backlight apparatus to prevent damages to circuit components or injuries to people. The circuit is designed in an integrated circuit to achieve the effects of reducing the area occupied by the circuit component layout and lowering the overall cost.

10 Claims, 6 Drawing Sheets

FEEDBACK AND PROTECTION CIRCUIT OF LIQUID CRYSTAL DISPLAY PANEL BACKLIGHT APPARATUS

FIELD OF THE INVENTION

The present invention relates to a feedback and protection circuit of a liquid crystal display panel backlight apparatus, and more particularly to a circuit designed in an integrated circuit to simplify a traditional feedback and protection circuit comprised of different components and achieve the effects of reducing the area occupied by the circuit component layout and lowering the overall cost.

BACKGROUND OF THE INVENTION

Since an LCD panel backlight apparatus uses a high-frequency AC sine wave power supply to provide energy for a cold cathode fluorescent lamp (CCFL) to emit lights, therefore a DC-to-AC circuit is used for the purpose of achieving the energy conversion. A traditional DC/AC inverter usually adopts one pulse width modulation controller (PWM controller) specifically designed for the DC/AC inverter to control the whole inverter circuit to supply a sufficient light source for all cold cathode fluorescent lamps to emit lights. However, a piece of PWM controller only has a voltage feedback input terminal, a current feedback input terminal and an abnormal status protection control input terminal, and the LCD panel backlight apparatus must be able to integrate each voltage input signal and each current input signal of the cold cathode fluorescent lamp and output a single voltage feedback signal and a current feedback signal to an input terminal of the PWM controller. On the other hand, the LCD panel backlight apparatus must be able to detect whether or not any cold cathode fluorescent lamp (CCFL) is short circuited (or touched by a human body) or open circuited (or not lit), so as to output an abnormal status protection signal to the PWM controller and turn off all outputs of the backlight apparatus to protect the inverter circuit and prevent damages to circuit components or injuries to people due to electric shocks. The present traditional way is to recreate a feedback and protection circuit by various different components, and thus many complicated components are required. Referring to FIG. 1 for a circuit block diagram of a traditional LCD panel backlight apparatus feedback and protection circuit, each pin of an input terminal CNl1 is connected to an input voltage, a reference ground, an enable signal and a dimming signal, wherein the switching switch control circuit 1 comprises a plurality of power transistors (not shown in the figure) and a PWM controller 2, and an output terminal of the PWM controller 2 outputs a plurality of control pulse waves for driving various different switch topologies to electrically conduct the power transistors (not shown in the figure), such that the input voltage terminal can be converted from a primary coil of the transformers T1~T4 to a secondary coil to transmit energy. The leakage inductance of the secondary coil has a resonance with each serially connected capacitor to produce a sine wave voltage, which is outputted to two lateral sides of each cold cathode fluorescent lamp, such that the lamp emits lights to provide a light source of the backlight apparatus. The leakage inductance of a secondary coil of the transformer T 1 produces a resonance with capacitors C11, C12 connected in series; the leakage inductance of a secondary coil of the transformer T2 produces a resonance with capacitors C21, C22 connected in series; the leakage inductance of a secondary coil of the transformer T3 produces a resonance with capacitors C31, C32 connected in series; and the leakage inductance of a secondary coil of the transformer T4 produces a resonance with capacitors C41, C42 connected in series. Both terminals of output terminals CN1~CN4 are connected to a cold cathode fluorescent lamp for receiving a resonance to produce AC sine wave power respectively. The purpose of capacitors C12, C22, C32, C42 is to output and divide each high voltage and pass the voltage to the diodes D11, D21, D31, D41 to obtain a maximum voltage value, and the voltage-divided resistors R3, R2 are inputted by a voltage feedback input terminal of the PWM controller 2. The purpose of the diodes D12, D22, D32, D42 is to clamp a negative voltage of the capacitors C12, C22, C32, C42 to the diodes and reduce the voltage to approximately −0.7V. After the diodes D15, D25, D35, D45 obtain the voltage at the terminals of the capacitors C12, C22, C32, C42, the voltage is divided respectively by resistors R14 and R15, R24 and R25, R34 and R35, and R44 and R45 and filtered by capacitor C13, C23, C33, C43 to conduct transistors Q11, Q21, Q31, Q41 in the situation of obtaining a sufficient normal operation time. If any lamp is short circuited, then the transistors Q11, Q21, Q31, Q41 cannot be electrically conducted with the reference ground, and the power voltage VCC will be charged immediately to a capacitor C3 through a resistor R5. If the capacitor C3 is charged to an operating voltage of the transistor Q1, the transistor Q1 will be conducted to pull a current feedback input terminal of the PWM controller 2 to a low potential, such that the PWM controller 2 stops outputting, and thus closing all outputs of the backlight apparatus, and the resistor R33 is used for discharging the energy of the capacitor C3.

Further, the resistors R11, R21, R31, R41 are connected between the cold cathode fluorescent lamp and the reference ground for obtaining a current detection signal. Diodes D14, D24, D34, D44 are used for clamping the negative voltage of the resistors R11, R21, R31, R41 to the diodes and reducing the voltage to approximately −0.7V. After the diodes D13, D23, D33, D43 obtain a maximum voltage value of the resistors R11, R21, R31, R41, the voltage is divided by resistors R4, R1 and inputted to a current feedback input terminal of the PWM controller 2. After diodes D16, D26, D36, D46 obtain voltages at the terminals of the resistors R11, R21, R31, R41, and the voltage is divided by the resistors R12 and R13, R22 and R23, R32 and R33, and R42 and R43 and filtered by the capacitors C14, C24, C34, C44, a sufficient normal operation time can be obtain to conduct the transistors Q12, Q22, Q32, Q42. If any lamp is open circuited, then the transistors Q12, Q22, Q32, Q42 cannot be conducted to the reference ground, and the power voltage VCC will immediately charge the capacitor C3 through the resistors R6. If the capacitor C3 is charged to an operating voltage of the transistor Q1, the transistor Q1 will be conducted to pull the current feedback input terminal of the PWM controller 2 to a low potential, so as to stop the output of the PWM controller 2, and close all outputs of the backlight apparatus. The shortcomings of the traditional circuit include a use of many distributed components to achieve the feedback and protection control circuit, and an increase of the level of difficulty and the area of the layout of the printed circuit board as well as an increase of cost of the overall inverter circuit, and a control of an excessively large range of operating voltages of the transistor, and thus modulations cannot be made properly or protections cannot be achieved.

Therefore, it is a subject for the present invention to create a feedback and protection circuit of a liquid crystal display panel backlight apparatus that simplifies a traditional feedback and protection circuit composed of various different components and achieve the effects of reducing the area occupied by the circuit component layout and lowering the overall cost.

SUMMARY OF THE INVENTION

In view of the shortcoming of the prior art, the inventor of the present invention based on years of experience in the related industry to conduct extensive researches and experiments, and finally invented a feedback and protection circuit of a liquid crystal display panel backlight apparatus, in hope of adopting a circuit specifically designed in an integrated circuit to achieve the effects of reducing the area occupied by a circuit component layout and lowering the overall cost.

Therefore, it is a primary objective of the present invention to provide a feedback and protection circuit of a liquid crystal display panel backlight apparatus, such that a circuit designed in an integrated circuit can simplify the feedback and protection circuit composed of various different components to achieve the effects of reducing the area occupied by a circuit component layout and lowering the overall cost.

To achieve the foregoing objective, the present invention provides a feedback and protection circuit of a liquid crystal display panel backlight apparatus, comprising: at least one transformer, having a primary pole winding and a primary winding; a switching switch control circuit, having a PWM controller, and the switching switch control circuit is connected to an input terminal and the primary winding; a feedback and protection control unit, having at least one current signal input terminal, at least one voltage signal input terminal, a first delay control terminal, a second delay control terminal and at least one abnormal status protection signal terminal, and the abnormal status protection signal terminal is connected to the PWM controller; at least one current detection component, connected to the current signal input terminal; at least one voltage detection component, connected to the voltage signal input terminal; and at least one output terminal, connected to the secondary pole winding, a cold cathode fluorescent lamp, the current detection component and the voltage detection component; such that if the cold cathode fluorescent lamp is open circuited or short circuited, the feedback and protection control unit will produce an abnormal status protection signal to the PWM controller based on a first reference voltage value and a second reference voltage value, and the switching switch control circuit will stop all outputs of the LCD panel backlight apparatus.

The circuit is specifically designed in an integrated circuit to simply a traditional feedback and protection circuit composed of various different components, so as to achieve the effects of reducing the area occupied by the circuit component layout and lowering the overall cost.

DETAILED DESCRIPTION OF THE PREFERRED EMBODIMENTS

To make it easier for our examiner to understand the objective, features, and performance of the present invention, we use preferred embodiments together with the attached drawings for the detailed description of the invention.

Figure 1:
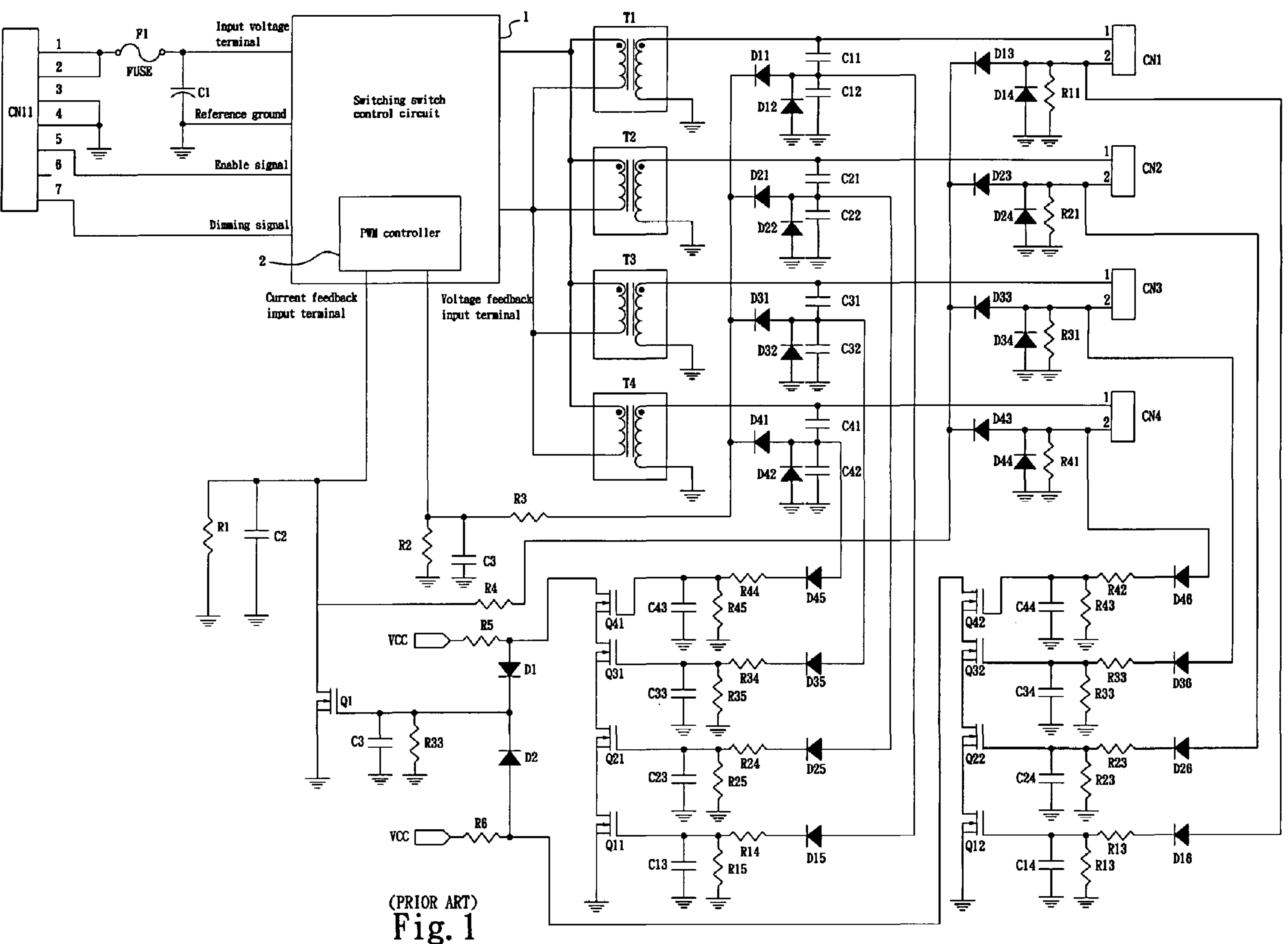
FIG. 1 is a circuit block diagram of a traditional feedback and protection circuit of an LCD panel backlight apparatus.
Figure 2:
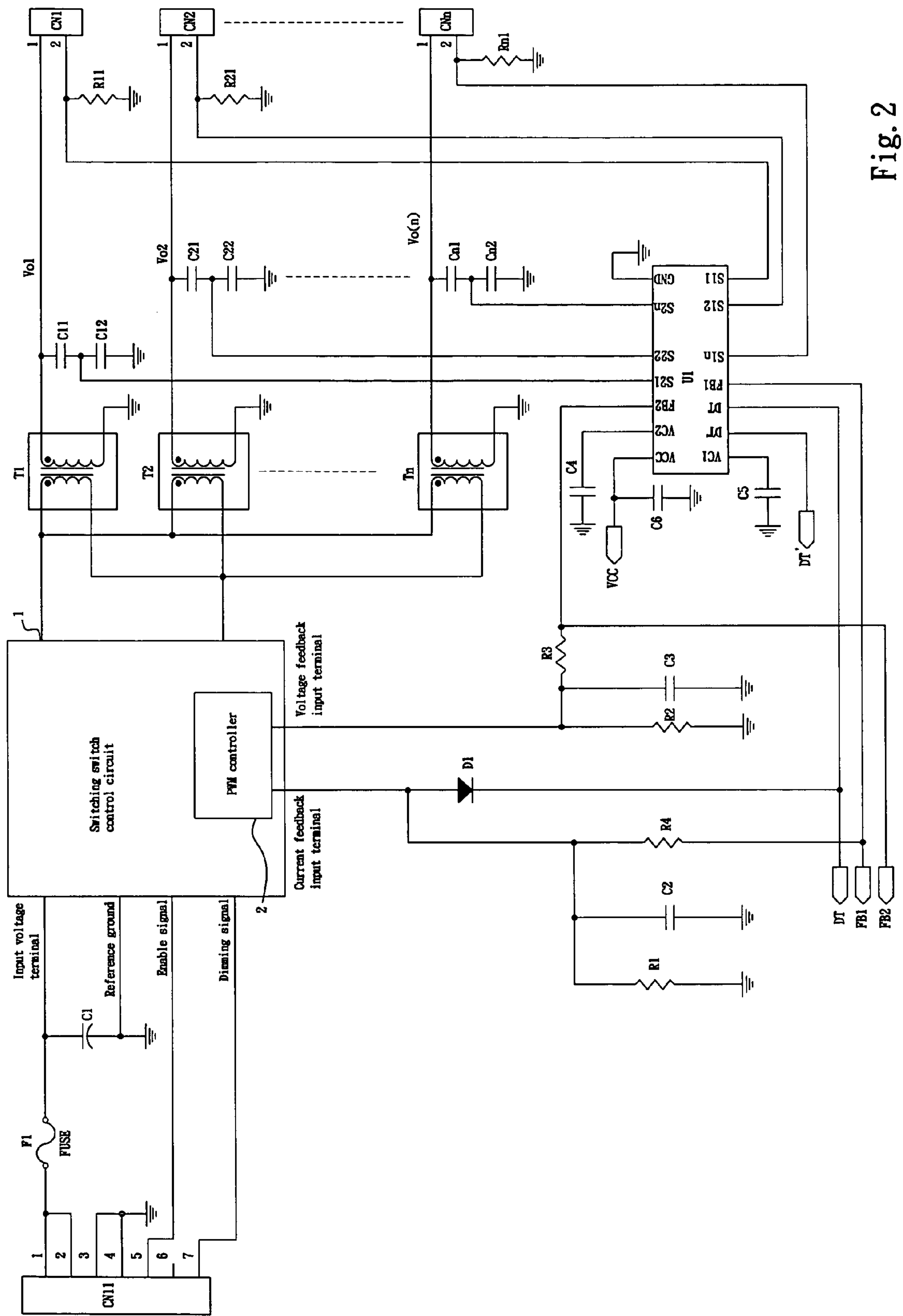
FIG. 2 is a system block diagram of a feedback and protection circuit of an LCD panel backlight apparatus in accordance with a preferred embodiment of the present invention.
Figure 3:
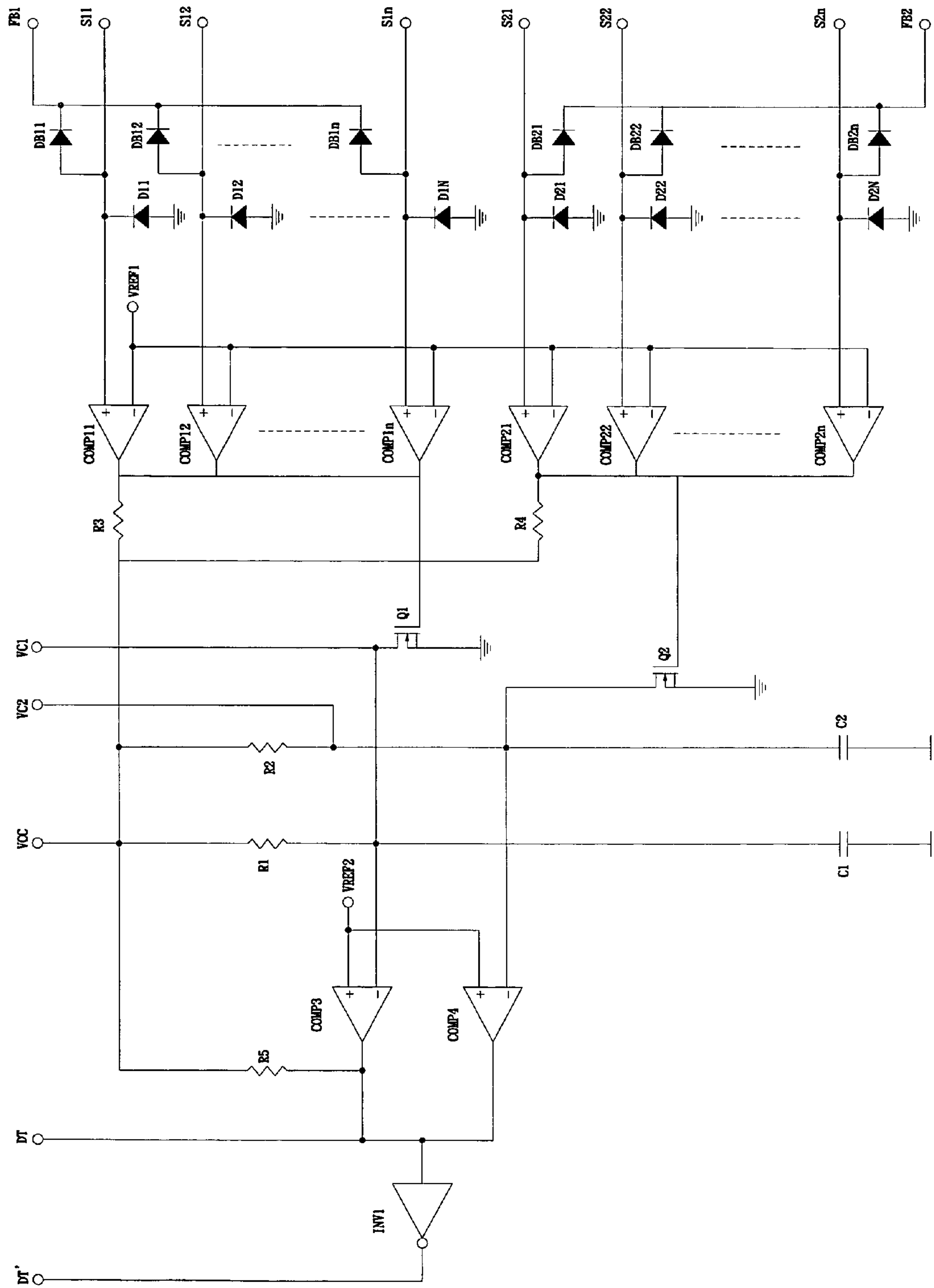
FIG. 3 is a detailed circuit block diagram of a feedback and protection circuit of an LCD panel backlight apparatus as depicted in FIG. 2.
Figure 6:
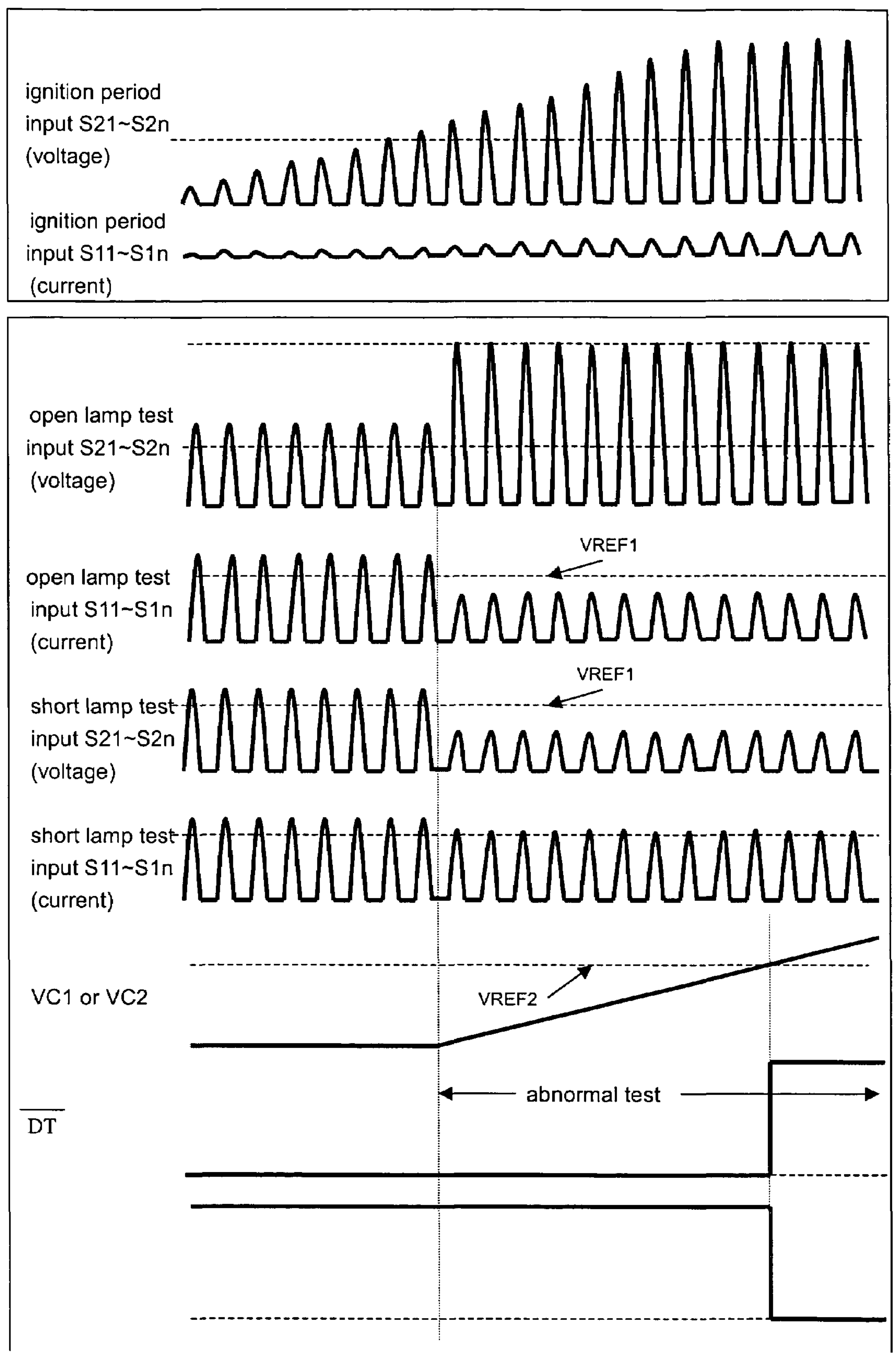
FIG. 6 is a waveform diagram of a feedback and protection circuit of a liquid crystal display panel backlight apparatus as depicted in FIG. 3.

Referring to FIG. 2 for a system block diagram of a feedback and protection circuit of a liquid crystal display panel backlight apparatus in accordance with a preferred embodiment of the present invention, FIG. 3 for a detailed internal circuit block diagram of a feedback and protection circuit of a liquid crystal display panel backlight apparatus as depicted in FIG. 2 and FIG. 6 for a waveform diagram of a feedback and protection circuit of a liquid crystal display panel backlight apparatus as depicted in FIG. 3, the feedback and protection circuit system comprises: a plurality of transformers T1~Tn, each having a primary pole winding and a primary winding; a switching switch control circuit 1, having a PWM controller 2, a switching switch control circuit 1 connected to an input terminal CN11 and a primary winding; a feedback and protection control unit U1, having a plurality of current signal input terminals S11~S1n, a plurality of voltage signal input terminals S21~S2n, a first delay control terminal VC1, a second delay control terminal VC2 and an abnormal status protection signal terminal DT connected to an inverted abnormal status protection signal terminal DT' produced by an inverter INV1, and the abnormal status protection signal terminal DT is connected to a PWM controller 2; a current detection component comprised of a resistor R11~Rn1 and connected to a current signal input terminal S11~S1n; a voltage detection component comprised of a plurality of capacitors C11 and C12, capacitors C21 and C22 . . . and capacitors Cn1 and Cn2 (which can be comprised of a plurality of resistors, or at least one resistor and a capacitor) and connected to a voltage signal input terminal. A voltage signal inputted to the current signal input terminal S21~S2n is an AC voltage signal or an AC voltage signal, and a voltage signal inputted to the voltage signal input terminal S21~S2n is an AC voltage signal or a DC voltage signal; and an output terminal CN1~CNn is connected to a secondary pole winding, a cold cathode fluorescent lamp, a current detection component and a voltage detection component; a current signal input terminal S11~S1n and a voltage signal input terminal S21~S2n, each connected to a clamp diode for reducing the input signal to a level of a negative voltage of the clamp diode. Therefore, the signals of the voltage signal input terminals S21~S2n and the current signal input terminals S11~S1n can be calculated by the following equation:

$$S21{\sim}S2n=VCn2=2*Vo(n)*[Cn1/(Cn1+Cn2)]-VD$$

$$S11{\sim}S1n=Io(n)*Rn1$$

Where, Vo(1)~Vo(n) are the first output voltage ~the $n^{th}$ output voltage, Io(l)~Io(n) are the $1^{st}$ output current ~the $n^{th}$ output current and VD is a diode voltage.

After the first feedback output FBI and the second feedback output FB2 integrate the signals of current signal input terminals S11~S1n with the signals of the voltage signal input terminals S21~S2n, a maximum value is obtained from the diodes, and the first feedback output FB1 and the second feedback output FB2 are calculated by the following equations:

$FB1=[S11 \sim S1n]\max - VD$ $FB2=[S21 \sim S2n]\max - VD$

If any cold cathode fluorescent lamp is open circuited (or not lit), several sets of single input current comparators COMP11~COMP1n compare the peak value of the voltage signals with a first reference voltage value VERF 1. If the peak value of the voltage signals is smaller than the first reference voltage value VERF1, several sets of single input current comparators COMP11~COMP1n will output a stop signal, and the voltage of the first delay control terminal VC1. If the voltage of the first delay control terminal VC1 is greater than a second reference voltage value VERF2, the feedback and protection control unit U1 will output an abnormal status protection signal through an abnormal status protection signal terminal DT; if the cold cathode fluorescent lamp is short circuited, several single input voltage comparators COMP21~COMP2n will compare the peak value of the voltage signals with the first reference voltage value VERF1; and if the peak value of the voltage signals is smaller than the first reference voltage value VERF1, the voltage comparators COMP21~COMP2n will output a stop signal, such that the voltage of the second delay control terminal VC2 is increased gradually. If the voltage of the second delay control terminal VC2 is greater than the second reference voltage value VERF2, the feedback and protection control unit U1 will output the abnormal status protection signal through the abnormal status protection signal terminal DT. The method for delaying the control of the first delay control terminal VC1 and the second delay control terminal VC2 is an internal fixed delay control method or an external delay control method.

Figure 4:
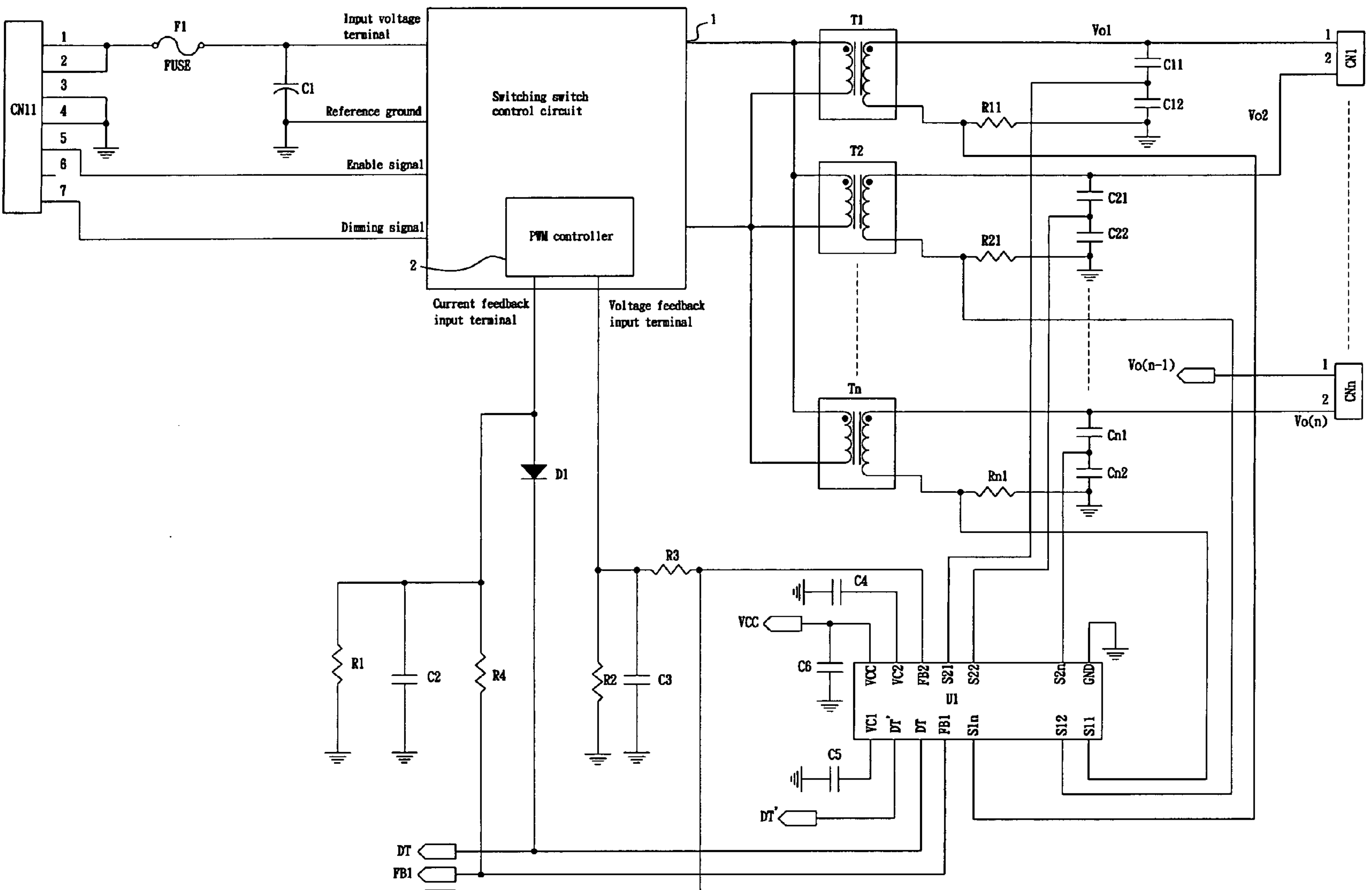
FIG. 4 is a system block diagram of a feedback and protection circuit of an LCD panel backlight apparatus in accordance with another preferred embodiment of the present invention.

Referring to FIG. 4 for a system block diagram of feedback and protection circuit of a liquid crystal display panel backlight apparatus in accordance with another preferred embodiment of the present invention, the output terminal applied for an LCD TV has no return line (RETURN) as shown in FIG. 4. Unlike FIG. 4, there is a return line (RETURN) as shown in FIG. 2, and their difference resides on that the AC waveforms for the voltage and current input signals are the same, and the AC waveforms for the voltage and current input signals as shown in FIG. 4 are inverted. There is no other difference on their operation, besides the inverted AC waveforms of the voltage and current input signals, and the applications as illustrated in FIGS. 2 and 4 provide different choices for the applications of the present invention.

Figure 5:
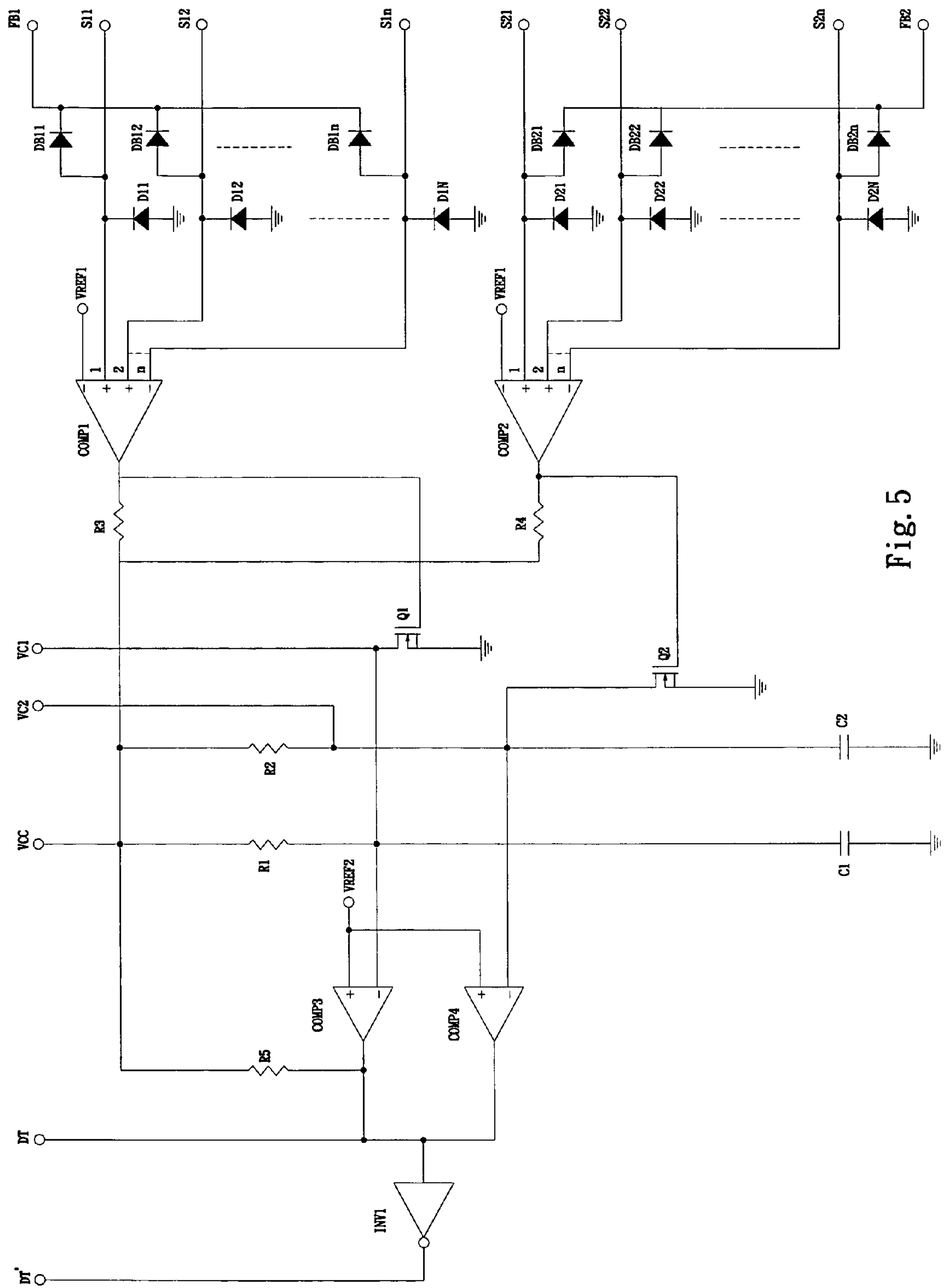
FIG. 5 is a circuit block diagram of another feedback and protection circuit of an LCD panel backlight apparatus as depicted in FIG. 3.

FIG. 5 is a circuit block diagram of another feedback and protection circuit of an LCD panel backlight apparatus as depicted in FIG. 3. The difference of FIG. 5 with FIG. 3 resides on that several sets of single input current comparators COMP11~COMP1n and several single input voltage comparators COMP21~COMP2n as shown in FIG. 3 are integrated into a plurality of input current comparators COMPI and a plurality of input voltage comparators COMP2 to simplify the circuit.

In summation of the description above, the present invention herein enhances the performance over the conventional structure by designing a circuit into an integrated circuit to simplify a traditional feedback and protection circuit comprised of various different components, so as to achieve the effects of reducing the area occupied by the circuit component layout and lowering the overall cost, and thus the present invention can comply with the patent application requirements and the products produced according to the present invention can meet the current market requirements.

What is claimed is:

1. A feedback and protection circuit of a liquid crystal display panel backlight apparatus, comprising:

at least one transformer, having a primary pole winding and a primary winding;

a switching switch control circuit, having a PWM controller, and said switching switch control circuit is connected to an input terminal and said primary winding;

a feedback and protection control unit, having at least one current signal input terminal, at least one voltage signal input terminal, a first delay control terminal, a second delay control terminal and at least one abnormal status protection signal terminal, and said abnormal status protection signal terminal is connected to said PWM controller;

at least one current detection component, connected to the current signal input terminal;

at least one voltage detection component, connected to said voltage signal input terminal; and at least one output terminal, connected to said secondary pole winding, a cold cathode fluorescent lamp, said current detection component and said voltage detection component;

wherein if said cold cathode fluorescent lamp is open circuited or short circuited, said feedback and protection control unit will produce an abnormal status protection signal to said PWM controller based on a first reference voltage value and a second reference voltage value to stop all outputs from said switching switch control circuit to said LCD panel backlight apparatus.

2. The feedback and protection circuit of a liquid crystal display panel backlight apparatus of claim 1, wherein said current signal input terminal is inputted with a voltage signal which is either an AC voltage signal or a DC voltage signal.

3. The feedback and protection circuit of a liquid crystal display panel backlight apparatus of claims 2, further comprising at least one comparator, such that if said cold cathode fluorescent lamp is open circuited, said comparator will compare a peak value of said voltage signal and said first reference voltage value; if the peak value of said voltage signal is smaller than said first reference voltage value, said comparator will output a stop signal, so that said first delay control terminal voltage is increased gradually; if said first delay control terminal voltage is greater than said second reference voltage value, said feedback and protection control unit will output said abnormal status protection signal from said abnormal status protection signal terminal; if said cold cathode fluorescent lamp is short circuited, said comparator will compare a peak value of said voltage signal with said first reference voltage value; if the peak value of said voltage signal is smaller than said first reference voltage value, said comparator will output a stop signal, such that said second delay control terminal voltage is increased gradually; if said second delay control terminal voltage is greater than said second reference voltage value, said feedback and protection control unit will output said abnormal status protection signal from said abnormal status protection signal terminal.

4. The feedback and protection circuit of a liquid crystal display panel backlight apparatus of claim 1, wherein said voltage signal input terminal is inputted with a voltage signal which is either an AC voltage signal or a DC voltage signal.

5. The feedback and protection circuit of a liquid crystal display panel backlight apparatus of claims 4, further comprising at least one comparator, such that if said cold cathode fluorescent lamp is open circuited, said comparator will compare a peak value of said voltage signal and said first reference voltage value; if the peak value of said voltage signal is smaller than said first reference voltage value, said comparator will output a stop signal, so that said first delay control terminal voltage is increased gradually; if said first delay control terminal voltage is greater than said second reference voltage value, said feedback and protection control unit will output said abnormal status protection signal from said abnormal status protection signal terminal; if said cold cathode fluorescent lamp is short circuited, said comparator will compare a peak value of said voltage signal with said first reference voltage value; if the peak value of said voltage signal is smaller than said first reference voltage value, said comparator will output a stop signal, such that said second delay control terminal voltage is increased gradually; if said second delay control terminal voltage is greater than said second reference voltage value, said feedback and protection control unit will output said abnormal status protection signal from said abnormal status protection signal terminal.

6. The feedback and protection circuit of a liquid crystal display panel backlight apparatus of claim 1, wherein said comparator is a single input or a multiple input.

7. The feedback and protection circuit of a liquid crystal display panel backlight apparatus of claim 1, wherein said voltage detection component comprises a plurality of resistors and a plurality of capacitor, or at least one resistor and at least one capacitor.

8. The feedback and protection circuit of a liquid crystal display panel backlight apparatus of claim 1, wherein said current detection component comprises at least one resistor.

9. The feedback and protection circuit of a liquid crystal display panel backlight apparatus of claim 1, wherein said first delay control terminal and said second delay control terminal are delayed and controlled by an internal fixed delay control method or an external delay control method.

10. The feedback and protection circuit of a liquid crystal display panel backlight apparatus of claim 1, wherein said abnormal status protection signal terminal is connected to an inverter to produce an inverted abnormal status protection signal.

* * * * *